March 7, 1961 K. F. RENTSCHLER 2,973,701
PHOTOGRAPHIC INTRA-LENS SHUTTER WITH DELAYED ACTION DEVICE
Filed Aug. 19, 1954 2 Sheets-Sheet 2
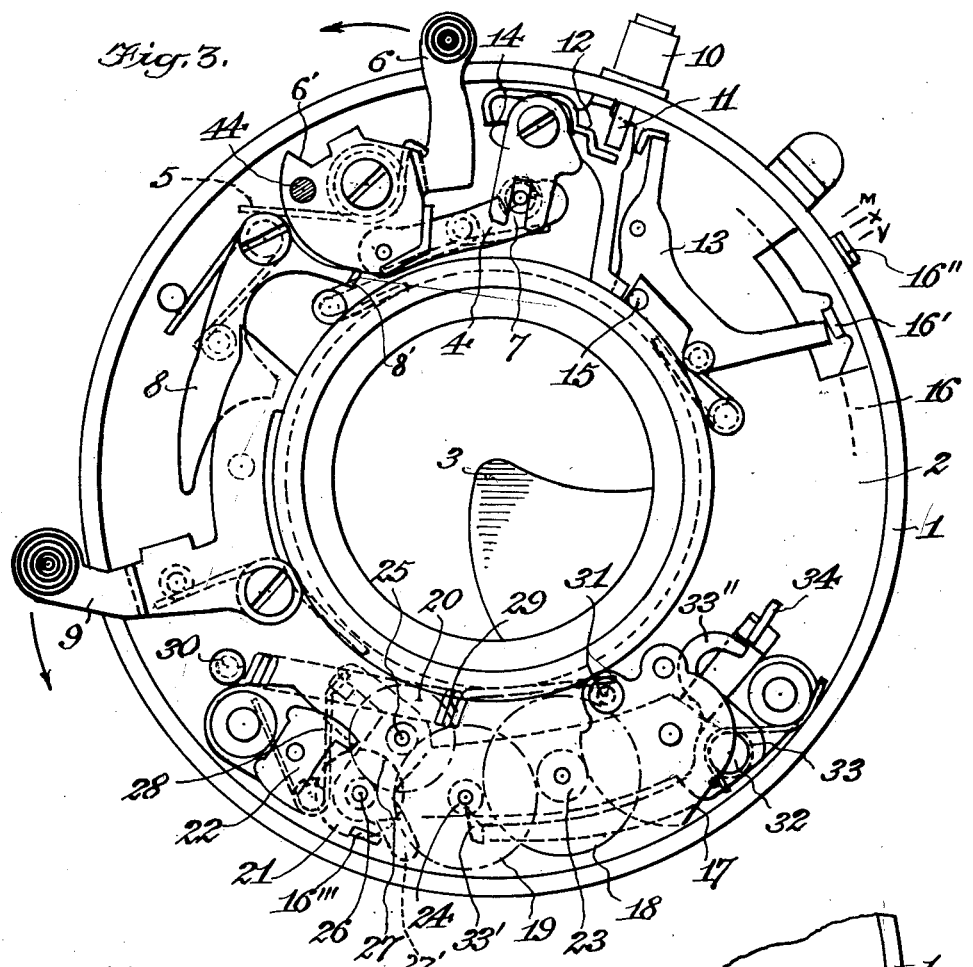
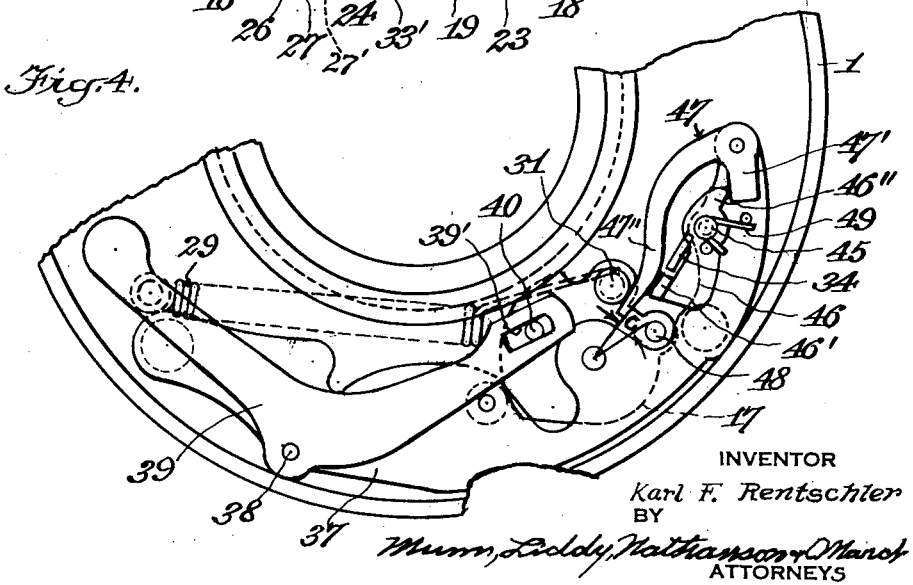
INVENTOR
Karl F. Rentschler
BY
Munn, Liddy, Nathanson & Marsh
ATTORNEYS

United States Patent Office 2,973,701
Patented Mar. 7, 1961

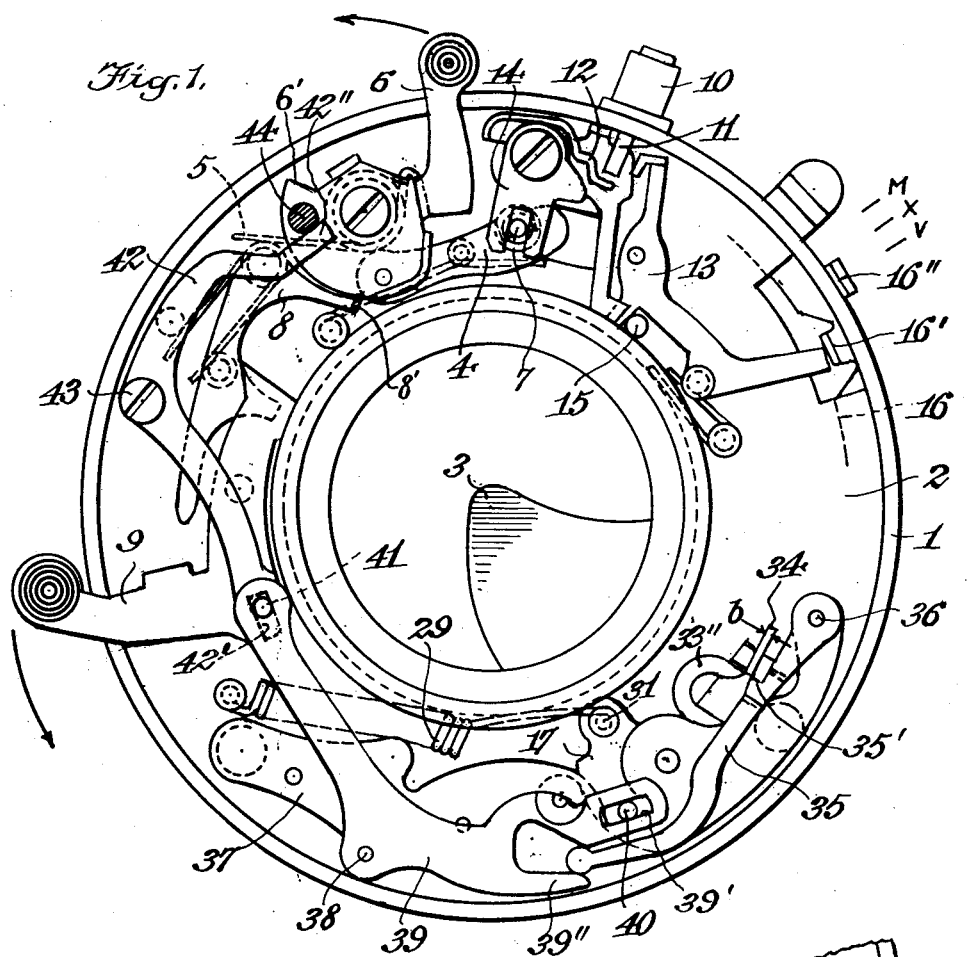

2,973,701

PHOTOGRAPHIC INTRA-LENS SHUTTER WITH DELAYED ACTION DEVICE

Karl F. Rentschler, Calmbach, Enz, Germany, assignor to Alfred Gauthier G.m.b.H., Calmbach, Enz, Germany, a corporation of Germany Filed Aug. 19, 1954, Ser. No. 451,017

Claims priority, application Germany Sept. 8, 1953

10 Claims. (Cl. 95—53.6)

This invention relates to a photographic intra-lens shutter with a delayed action device which is released by the movement of a member of the shutter blade drive mechanism.

The delayed action device in a shutter of the character mentioned may be used advantageously for making delayed action exposures as well as for disengaging one of its parts for obtaining time lags for the synchronization of flash lamps having lags suitable for high and highest shutter speeds.

It is a well known practice to cock the delayed action device simultaneously with the cocking of the shutter actuating mechanism in order to attain the most possible simplicity in the shutter operation.

If the delayed action device is used for the purpose of flash synchronization as well as for delayed action exposures, the device must comprise several pairs of gear wheels, pinions, a balance wheel, and a balance lever for obtaining a running time of about 10 seconds. In such case, and in order to assure the functional security and effect of the mechanism, the pre-cocking of the drive spring of the delayed action device must not be permitted to waste the power necessary to overcome the gear escapement as well as the friction effect on the delayed action device when it is released by the shutter blade drive mechanism.

In the hitherto known intra-lens shutters, the delayed action device of which is released in response to the movement of a member of the shutter blade drive mechanism, usually by the shutter blade ring, due to its size, the maximum cocking moment makes the handling of the shutter difficult when cocking the shutter and the delayed action device simultaneously. When cocking known intra-lens shutters manually, one disadvantage is that a comparatively great effort is required by the user; and another disadvantage is that when the cocking effort is coupled with the film winding operation, there results an increased stress on the transmission members arranged inside of the camera.

An object of the present invention is to provide a photographic intra-lens shutter with a delayed action device which overcomes the above mentioned disadvantages.

According to this invention the stated object is solved in that the delayed action device influences a locking device in the interior of the shutter only after a certain running time for releasing said locking device has elapsed. During the running time of the delayed action device the released shutter blade drive mechanism is held by the locking device. This provision offers the advantage that the delayed action device after its release at first has only to overcome the inherent action of the escapement, while the checked driving power of the shutter blade drive mechanism has no restraining effect on the delayed action device. When the releasing member of the delayed action device strikes the locking device to release the latter, the delayed action device has already attained a certain moving energy level that the impulse transmitted to the locking device will function to overcome the friction of the other parts.

In order to increase the effectiveness of the delayed action device and to decrease the pre-cocking effort required of the delayed action drive spring, it is further expedient to provide the locking device with respect to the delayed action device of such character that the length of the contact surface between the locking device and the arrested member of the shutter blade drive mechanism governing the releasing moment is shorter than the surface to be traversed by the releasing member of the delayed action device, said shorter surface being effective from the beginning of the influence on the locking device until the latter is released to unlock the shutter blade drive mechanism. Thus the effort required for releasing the locking device in addition to overcoming the power of the gear escapement is materially reduced and contributes to an even running down of the delayed action device.

For the locking device there may be used, preferably, a one-armed lever, but there is also the possibility that the locking device may comprise a two-armed lever which holds the releasable member of the shutter blade drive mechanism, and another lever to be influenced by the releasable member of the delayed action device which also influences said two-armed lever. Furthermore, it may be advantageous to perform the releasing of the delayed action device as well as the holding of the released shutter blade drive mechanism by means of a member connected with the shutter blade ring.

With reference to the specific features of the shutter, where nearly all parts are located interiorly of the shutter housing, it is also desirable to place the connecting parts between the cocking member of the shutter and the delayed action device within the shutter housing. The aforesaid parts may consist of two two-armed levers, one of them located on a bearing plate of the delayed action device; the bearing of the locking device may be on said bearing plate; and the two-armed lever may be used as an actuating member for the locking device.

In the accompanying drawings:

Fig. 1 is a side view of a shutter showing one embodiment of the present invention by which the cocking of the delayed action device and the shutter are effected simultaneously; the locking and releasing devices being arranged in the shutter housing; and for the sake of clearness all of the details of the delayed action device are not shown.

Fig. 2 is a fragmentary side view showing the relation of the parts of the locking device when the shutter is cocked.

Fig. 3 is a view similar to Fig. 1, but the locking device and the cooperative members between the shutter cocking member and the delayed action device being omitted so that details of the delayed action device may clearly appear.

Fig. 4 is a fragmentary side view showing a further embodiment of the locking device, and in which the delayed action device is cocked.

In the drawings there is shown a circular shutter housing 1 having a base plate 2 within the same. A transmission including a transmission member or shutter blade ring (not shown) is located on the plate 2 for oscillating the shutter blades to open and close the light aperture of the shutter, said ring being turnable in a clockwise direction for opening and in a counterclockwise direction for closing the shutter blades, as is usual and well understood in the art. Only one of the shutter blades is shown and designated 3. The drive of the shutter blade ring is accomplished in the transmission by means of a link member 4 having one end pivotally connected to a cocking lever 6 which is biased by a shutter drive spring 5.

A pin 7 on the shutter blade ring projects into a notch in the link member 4 to effect the reciprocating circumferential movement of said ring in response to the operation of the lever 6 in clockwise direction. The lever 6 is held in its cocked position by a spring biased lever 8 fulcrumed on the plate 2. For this reason, the end 8' of the lever 8 is engageable with a shoulder 6' of the lever 6 when the latter has reached its cocked position. A spring biased release lever 9 fulcrumed on the plate 2 cooperates with the lever 8.

In order to electrically connect flash guns or lamps, the shutter is equipped with a plug device 10 whose insulated middle pin 11 cooperates with a contact spring 12 and a spring biased lever 13 fulcrumed on the plate 2. A lever 14 fulcrumed on the plate 2 engages the pin 7 for actuating the spring 12 to close an ignition circuit through the device 10 at the moment, when the shutter light aperture is fully open, while the lever 13 is engageable with the pin 15, connected with the shutter blade ring. The contact closure by the lever 13 taking place after a small angular movement of the shutter blade ring is accomplished only when the lever 13 is not arrested by an arm 16' on a ring 16 rotatable on the housing 1. Lever 13 when freed by shifting of lug 16' is movable counterclockwise under the action of a wire spring located diagonally down and to the right from pin 15 carried by the shutter blade ring. The lever 13, however, is held immovable by pin 15, except when the shutter blade ring is actuated to open the shutter. Then, the pin 15 in moving diagonally downward and to the right, frees the lever 13 for counterclockwise turning, enabling the uppermost hooked portion thereof to come in contact with the contact pin 11 of the flash bulb circuit.

The delayed action device as shown in Fig. 3 comprises a toothed segment 17, gear wheels 18, 19 and 20, an escape wheel 21, an inertia weight member 22 cooperating with the escape wheel 21 and pinions 23, 24, 25 and 26. The gear wheel 20 with the pinion 25 as well as the escape wheel 21 with the pinion 26 and the member 22 are supported on a bridge 27 which is swingable around the axis of the escape wheel 21. The bridge 27 is biased by a spring 28 to move clockwise and thereby engage the pinion 25 with the gear 19. By moving the bridge 27 in a counterclockwise direction against the action of the spring 28 the gear 19 and the pinion 25 are disengaged. The drive of the delayed action device is effected by a spring 29 having one end connected with the plate 2, as at 30, and the opposite end of the spring is connected with a pin 31 on the segment 17. The delayed action device is held cocked by means of a two-armed lever 33 fulcrumed as at 32 and provided with a detent 33' engageable with the pinion 24.

To release the delayed action device use is made of an arm 34 of the aforesaid transmission, in the nature of a piece of metal whose opposite sides are flat, said arm projecting laterally from the shutter blade ring so as to move edgewise as the ring is given angular movement. The leading edge of the arm 34 acts on the end 33'' of the second arm of the lever 33 and rocks the latter counterclockwise thereby causing the disengagement of the detent 33' from the pinion 24 enabling the delayed action device to function in response to a small increment of angular movement of the shutter blade ring of the transmission, during which the shutter blades 3 remain closed by reason of their overlapping relation with respect to each other. In the time interval between the beginning of the rotational movement of the shutter blade ring and the release of the delayed action device by the arm 34, the lever 13 contacts the pin 11 for effecting the circuit closing operation mentioned hereinabove.

In accordance with the invention use is made of a mechanical-advantage type of locking device for arresting the shutter blade ring and with it the arm 34 which constitutes a component of the shutter blade drive mechanism. The locking device holds the shutter blade ring during the running down of the delayed action device and will be influenced by the locking device only after the delayed action device has run down for a predetermined period of time. In the embodiment of the invention shown in Fig. 1, the locking device or abutment consists of a one-armed lever 35 fulcrumed as at 36 on a bearing plate 37 of the delayed action device. The nose 35' of the lever 35 when engaged with the arm 34 holds the shutter blade ring against clockwise movement.

For releasing the locking device, the lever 35 is actuated through a spacing-type lost-motion driving connection, by a two-armed lever 39 fulcrumed on the bearing plate 37 as at 38. The segment 17 has a laterally projecting pin 40 thereon engaged in a slot 39' of the lever 39. Consequently, the lever 39 is rocked clockwise during the running down of the delayed action device. It is obvious from Fig. 2 that the forked end of the lever 39 has a slot of tapered shape, in which the end of the lever 35 is received, and that therefore space or clearance may exist between the said end of the lever 35 and the edges of the tapered slot in the lever 39, as clearly seen in Fig. 2. This space or clearance effects the said lost-motion connection, whereby the lever 35 is influenced by the lever 39 only after the lever 39 has rocked clockwise a distance or space equal to that indicated at $a$ by the opposed arrows as the delayed action device starts to run down.

Figs. 1 and 2 indicate the distance traversed by the pin 40 with respect to the part 39'' of the lever 39 which influences the lever 35 for the complete release of the lock is greater than the length of the touching face of the nose 35' of the lever 35 with respect to the leading end edge of the arm 34. The mentioned length is equivalent to the thickness of the material of the arm 34 as indicated at $b$ in Fig. 1.

The two-armed lever 39 is one component of the space-type lost motion transmission means between the cocking lever 6 and the segment 17 of the delayed action device. On the end of the second arm of the lever 39 is a laterally projecting pin 41 which is engaged in a slot 42' of the two-armed lever 42. The lever 42 is fulcrumed as at 43 in the housing 1. When cocking the shutter, the arm 42'' is actuated by a beveled pin 44 projecting laterally from the cocking lever 6. Due to the cooperation of the parts 40, 39, 42 and 44 the delayed action device and the shutter are cocked simultaneously. The bevelled surface of the pin 44 causes an easy deflection off the arm 42'' in its rest position when the cocking lever 6 returns to its rest position.

Due to the structural features of the locking device and the releasing operation, the pre-cocking of the drive spring 29 of the delayed action device is accomplished with a minimum of effort. The releasing operation makes it possible to use a cocking lever 6 as well as the levers 39 and 42 of comparatively thin material, so that the required space in the shutter housing is as small as possible. Also by supporting the levers 35 and 39 on the bearing plate 37 there is more space available in the housing 1.

The lever arrangement between the cocking lever 6 and the delayed action device, for example, in comparison with a connecting ring is an important advantage. This is so because a connecting ring requires greater space either inside or outside of the shutter housing. In the case of a delayed action device which is released in the manner described herein serves not only for flash lamp synchronization requiring a running time of about 20 msec., but also serves for delayed action exposures requiring a running time of about 10 seconds, and as pointed out above is possible only if the pre-cocking of the drive spring of the delayed action device is accomplished with a minimum of power.

The operation of the shutter is as follows.

To cock the shutter and the delayed action device simultaneously, the lever 6 is moved in the direction indicated by the arrow in Fig. 1. This causes the pin 44 to bear on the arm 42" of the lever 42 which rocks the latter clockwise. The notched end of the lever 42 acts on the pin 41 causing the lever 39 to rock counterclockwise causing the portion 39" to actuate the lever 35 and move it from its released position shown in Fig. 1 into its locked position shown in Fig. 2 causing the nose 35' to engage the arm 34 of the shutter blade ring and to hold the ring in a cocked position and the blades 3 closed. At the same time the slotted end portion 39' acting on the pin 40 causes the segment 17 to turn clockwise thereby cocking the delayed action device. The portion 33' of the detent arm 33 engages the gear 24 under the influence of a spring in a manner known per se thereby arresting the cocked delayed action device. The operative positions of the nose 35' of the lever 35 and the end portion 33" of the lever 33 are such that the limiting edge of the portion 33" projects about 2/10 mm. farther than the limiting edge of the nose 35' with respect to the arm 34.

By actuating the release lever 9 in the direction indicated by the arrow in Fig. 1 while the shutter and the delayed action device are cocked, the lever 8 is rocked clockwise, thereby releasing the shutter cocking lever 6 and enabling the movement of the shutter blade ring. Then action occurs in three phases as follows. First phase: During the clockwise movement of the cocking lever 6 approximately forty degrees, the shutter blade ring is moved clockwise which causes partial opening movement of the shutter blades 3. Second phase: During the further return clockwise movement of the lever 6, approximately thirty-five degrees, the shutter blade ring and therefore the blades 3 have little or no movement due to lost motion between the link member 4 and the pin 7. Third phase: As the lever 6 continues its return clockwise movement and until it reaches its uncocked position as shown in Figs. 1 and 2, the lever 6 travels approximately forty degrees farther causing the shutter blade ring to move counterclockwise by means of the link member 4, finally causing the closing movement of the shutter blades 3 into their closed position. The shutter blade ring is then locked in its rest position by the link member 4. As mentioned above, the shutter blade ring is turned in clockwise direction by means of the connection link 7 upon the release of the shutter being effected. After a slight increment of angular movement the arm 34 of the ring acts on the end portion 33" of the lever 33, rocking the latter in counterclockwise direction, causing disengagement of the detent 33' from the pinon 24 and enabling the delayed action device to run down. Immediately after the delayed action device has been released, the arm 34 of the shutter blade ring engages the nose 35' of the lever 35, the latter locking the shutter blade ring and therefore all the other parts of the blade-drive-mechanism against further movement in clockwise direction. In the initial stage of the run-down operation of the delayed action device there occurs only slight angular movement of the segment 17 a distance equal to that indicated at $a$. Thereafter, the lever 39 engages the lever 35, turning the latter in counterclockwise direction and therefore disengaging the nose 35' of the lever 35 from the arm 34 of the shutter blade ring and so releasing the latter for opening and closing the shutter blades. Due to the difference in thickness $b$ of the arm 34 and the travel distance $a$ of the segment 17, the power effort of the delayed action device for releasing the lever 35 is almost nil. During the time interval equal to the travel distance $a$ the delayed action device reaches a high level of power effort because there is little or no static friction of the parts to be overcome, with the result that a maximum effort of the delayed action device is attained.

The present delayed action device also may be used for delayed action exposures for flash synchronization. It may be adjusted for delayed action exposures by moving the ring 16 to bring the index mark 16" in registry with the setting mark V. In such case both groups of the delayed action device, namely, one group consisting of the parts 17, 18, 19, 23 and 24, and the other group consisting of the parts 20, 21, 22, 25 and 26, placed on the bridge 27 are in engagement. Thus the running time of the delayed action device is about 10 seconds. When set to V position the contact lever 13 is arrested by the lateral arm 16' of the ring 16 so that a closure of the contact lever 13 against the middle pin 11 of the device 10 cannot take place. However, due to the counterclockwise movement of the lever 14 in response to the opening of the shutter, caused by the connection of the lever 14 with the pin 7 a circuit closing operation may be effected by the contact spring 12 only when the shutter light aperture is fully opened by the blades 3.

When the shutter is set at X, the contact lever 13 remains arrested and the flash circuit is effected as described above. During the setting to the mark X, the arm 16" of the ring 16 engages an arm 27' (Fig. 3) of the bridge 27, rocking the latter in a counterclockwise direction against the action of the spring 28 and disengaging the gear 19 and the pinion 25. After the release of the shutter blade ring said ring is stopped during the running time of the group 17, 18, 19, 23 and 24 of the delayed action device about 20 msec. which causes the opening and closing of the shutter.

When setting the ring 16 to the index M both delayed action device groups are independent, and the contact lever 13 is free. Therefore the lever 13 may effect a circuit closing operation after the turning movement of the shutter blade ring has started, whereas the opening of the shutter is effected again after the running time of about 20 msec. for one group of the delayed action device. In this case a delaying time of about 20 msec. has been reached which allows the use of flash lamps with the highest shutter speed.

Fig. 4 shows a further embodiment of the invention. On the bearing plate 37 there is fulcrumed as at 45 a two-armed lever 46 which is adapted to arrest the shutter blade ring arm 34 by means of the nose 46' of the second arm of the lever 46. The second arm 47" of a lever 47 may be actuated by a pin 48 projecting laterally from the segment 17. By means of a spring 49 the lever 46 is moved in a clockwise direction. In Fig. 4 the delayed action device is cocked. It is apparent that the pin 48 moves in an arcuate path a distance indicated at $c$ thereby engaging the arm 47" to operate the lever 47 for the purpose of releasing the lock. The operation of the embodiment shown in Fig. 4 corresponds fully to the operation of the embodiment of the invention shown in Figs. 1, 2 and 3. It is to be understood that when cocking, the lever 47 is brought by the pin 31 of the segment 17 into its position shown in Fig. 4, whereas the lever 46 follows the lever 47 under the influence of the spring 49 causing the lever 46 to again reach its locking position.

It is to be further understood that the means for locking the delayed action device may be diversely formulated for a rule of action in which the influence of the lock begins only after a certain running time of the delayed action device, and requiring a minimum of effort to release the lock.

I claim:

1. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; and a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part.

2. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; and a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part, said lost-motion driving connection further including fork and tongue members one of which constitutes the said driven part and the other of which is coupled to the delayed-action device and adapted to be actuated both in the cocking of said device and in the rundown thereof.

3. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part; and means for simultaneously cocking said shutter-drive mechanism and delayed-action device.

4. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part; means for simultaneously cocking said shutter-drive mechanism and delayed-action device; a second means for releasably locking the shutter drive mechanism in a cocked condition; and means for releasably locking the delayed-action device in cocked condition, said last-named means being actuated to release the delayed-action device in response to movement of the transmission member of the shutter drive mechanism after release of the latter by the said second locking means.

5. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part; means for simultaneously cocking said shutter-drive mechanism and delayed-action device; latch means for releasably locking the delayed-action device in cocked condition; and means responsive to movement of the transmission member of the shutter-drive mechanism in shutter-opening direction for actuating said latch means to release the delayed-action device prior to the said locking means which engages the transmission member of the shutter drive mechanism becoming effective.

6. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; and a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part, said part comprising a second-class lever having a shoulder constituting said abutment and adapted to engage said transmission member of the shutter drive mechanism.

7. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; and a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part, said part comprising a first-class lever having the said abutment engageable with the transmission member of the said shutter drive mechanism, and said locking means including an additional lever which actuates the first-class lever in response to running down of the delayed-action device.

8. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part; and separate means for releasably locking the delayed-action device in cocked condition, said transmission member of the shutter drive mechanism including a rotatable ring and a lug carried thereby, said lug being engageable with both said locking means seriatim.

9. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to driven portions of said driven movable part; a shutter housing; a lever arrangement within said housing; a cocking lever on said housing; and means including said lever arrangement, responsive to movement of said cocking lever for simultaneously cocking both the shutter drive mechanism and the delayed-action device.

10. In a photographic shutter, a spring-charged shutter blade drive mechanism adapted to be cocked and having a transmission including a transmission member which moves simultaneously with opening of the shutter blades; means including an abutment engageable with said transmission member of the transmission, for releasably locking the drive mechanism against movement to open the shutter; an actuator-type spring-powered delayed-action device adapted to be cocked with the spring thereof charged and to run down thereafter, said device having sufficient power for actuating said locking means to release the same; a mechanical coupling having two movable members and a spacing-type lost-motion driving connection between said members, for effecting a drive between the delayed-action device and releasable locking means, said coupling providing for releasing actuation of the locking means by the delayed-action device only after a minor interval of free running of the latter and free movement of one of said two movable members, during which interval the locking means remains stationary, thereby to delay release of the said transmission member of the shutter drive mechanism, said lost-motion driving connection and releasable locking means including a driven movable part for actuating said abutment and for providing a reduction in movement and an increase in power of the abutment at the point of engagement of the abutment with the transmission member, said movement and power being considered with respect to portions of said driven movable part; a shutter housing; a lever arrangement within said housing; a cocking lever on said housing; means including said lever arrangement, responsive to movement of said cocking lever for simultaneously cocking both the shutter drive mechanism and the delayed-action device, said lever arrangement comprising two two-armed levers; and a bearing plate for said delayed-action device, one of said two-armed levers being carried by said bearing plate and constituting the said one of the two movable members.

References Cited in the file of this patent

UNITED STATES PATENTS

| | | |
|---|---|---|
| 1,941,292 | Deckel et al. | Dec. 26, 1933 |
| 1,953,556 | Gitzhoven | Apr. 3, 1934 |
| 2,448,876 | Fuerst | Sept. 7, 1948 |

FOREIGN PATENTS

| | | |
|---|---|---|
| 721,872 | Germany | June 20, 1942 |